US012665269B2

(12) United States Patent
Park

(10) Patent No.: US 12,665,269 B2
(45) Date of Patent: Jun. 23, 2026

(54) ELECTRODE ASSEMBLY INCLUDING ELECTRODE LEAD COUPLING UNIT COUPLED BY ADHESION PORTION AND SPOT WELDING AND POUCH-SHAPED BATTERY CELL INCLUDING THE SAME

(71) Applicant: LG Energy Solution, Ltd., Seoul (KR)

(72) Inventor: Jong Pil Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 865 days.

(21) Appl. No.: 17/797,012

(22) PCT Filed: Jan. 27, 2021

(86) PCT No.: PCT/KR2021/001111
§ 371 (c)(1),
(2) Date: Aug. 2, 2022

(87) PCT Pub. No.: WO2021/162288
PCT Pub. Date: Aug. 19, 2021

(65) Prior Publication Data
US 2023/0063338 A1 Mar. 2, 2023

(30) Foreign Application Priority Data
Feb. 10, 2020 (KR) ........................ 10-2020-0015596

(51) Int. Cl.
*H01M 50/54* (2021.01)
*B23K 11/11* (2006.01)
(Continued)

(52) U.S. Cl.
CPC ............. *H01M 50/54* (2021.01); *B23K 11/11* (2013.01); *H01M 50/105* (2021.01);
(Continued)

(58) Field of Classification Search
CPC .. H01M 50/54; H01M 50/105; H01M 50/183; H01M 50/536; H01M 50/557;
(Continued)

(56) References Cited

U.S. PATENT DOCUMENTS

2003/0121142 A1* 7/2003 Kikuchi ................ H01M 50/50
429/160
2009/0085519 A1 4/2009 Kim
(Continued)

FOREIGN PATENT DOCUMENTS

CN 102055038 A 5/2011
CN 105684183 A 6/2016
(Continued)

OTHER PUBLICATIONS

Huang et al. (Comprehensive Properties of Grafted Polypropylene Insulation Materials for AC/DC Distribution Power Cables Jun. 4, 2023) (Year: 2023).*
(Continued)

*Primary Examiner* — Matthew T Martin
*Assistant Examiner* — Bartholomew A Hornsby
(74) *Attorney, Agent, or Firm* — Lerner David LLP

(57) ABSTRACT
The present invention relates to an electrode assembly, wherein a plurality of electrodes is stacked in the state in which a separator is interposed between the electrodes, electrode tabs protruding from the electrodes are coupled to an electrode lead in a state of forming an electrode tab bundle, the electrode lead includes a first electrode lead coupled to the electrode tabs and a second electrode lead coupled to the first electrode lead, and an electrode lead coupling portion configured to allow the first electrode lead and the second electrode lead coupled to be coupled to each other includes an adhesion portion and a spot welding portion.

12 Claims, 5 Drawing Sheets

(51) Int. Cl.

| | |
|---|---|
| *H01M 50/105* | (2021.01) |
| *H01M 50/183* | (2021.01) |
| *H01M 50/536* | (2021.01) |
| *H01M 50/557* | (2021.01) |

(52) U.S. Cl.
CPC ....... *H01M 50/183* (2021.01); *H01M 50/536* (2021.01); *H01M 50/557* (2021.01)

(58) Field of Classification Search
CPC .......... H01M 50/178; H01M 10/0525; H01M 50/553; H01M 50/172; H01M 50/531; H01M 50/543; B23K 11/11; B23K 11/115; B23K 2101/38
See application file for complete search history.

(56) References Cited

U.S. PATENT DOCUMENTS

| | | | |
|---|---|---|---|
| 2010/0285353 A1 | 11/2010 | Katayama et al. | |
| 2011/0104520 A1* | 5/2011 | Ahn | H01M 50/574 |
| | | | 429/7 |
| 2014/0058598 A1 | 2/2014 | Matsui et al. | |
| 2016/0028068 A1* | 1/2016 | Yang | H01M 50/178 |
| | | | 429/61 |
| 2018/0053976 A1 | 2/2018 | Park et al. | |
| 2018/0219246 A1 | 8/2018 | Park | |
| 2018/0351220 A1 | 12/2018 | Homann | |
| 2019/0190082 A1 | 6/2019 | Morooka et al. | |
| 2019/0207196 A1 | 7/2019 | Park et al. | |
| 2020/0006740 A1 | 1/2020 | Park et al. | |
| 2020/0127246 A1 | 4/2020 | Choi et al. | |
| 2020/0144587 A1 | 5/2020 | Kim et al. | |
| 2020/0251713 A1 | 8/2020 | Park et al. | |
| 2022/0052428 A1 | 2/2022 | Kim et al. | |

FOREIGN PATENT DOCUMENTS

| | | | | |
|---|---|---|---|---|
| CN | 108695453 A | | 10/2018 | |
| CN | 109643767 A | | 4/2019 | |
| CN | 109679552 A | * | 4/2019 | .......... H10F 19/906 |
| CN | 110036507 A | | 7/2019 | |
| CN | 110165136 A | | 8/2019 | |
| CN | 110770932 A | | 2/2020 | |
| GB | 2590392 A | | 6/2021 | |
| JP | 2010157484 A | | 7/2010 | |
| JP | 2011096664 A | | 5/2011 | |
| JP | 2013206821 A | | 10/2013 | |
| JP | 2014010967 A | | 1/2014 | |
| JP | 2014060143 A | | 4/2014 | |
| JP | 2019535111 A | | 12/2019 | |
| KR | 20090032273 A | | 4/2009 | |
| KR | 20110048470 A | | 5/2011 | |
| KR | 20130014253 A | | 2/2013 | |
| KR | 20130066039 A | | 6/2013 | |
| KR | 20140139793 A | | 12/2014 | |
| KR | 101651649 B1 | | 8/2016 | |
| KR | 20160094009 A | | 8/2016 | |
| KR | 20170126108 A | | 11/2017 | |
| KR | 20180090099 A | | 8/2018 | |
| KR | 20180119106 A | | 11/2018 | |
| KR | 20190027615 A | | 3/2019 | |
| KR | 20190059677 A | | 5/2019 | |
| KR | 20190083413 A | | 7/2019 | |
| KR | 20190134201 A | | 12/2019 | |
| WO | 2019225882 A1 | | 11/2019 | |

OTHER PUBLICATIONS

Welding Handbook.com "Advantages of Welding," retrieved from https://www.weldinghandbook.com/welding-vs-adhesive-bonding-when-to-choose-each-method/ on Apr. 27, 2025. (Year: 2025).*
International Search Report for Application No. PCT/KR2021/001111 mailed May 4, 2021, pp. 1-3.
Extended European Search Report including Written Opinion for Application No. 21753338.9 dated Dec. 8, 2023, pp. 1-7.
Search Report dated Dec. 19, 2023 from the Office Action for Chinese Application No. 202180007210.1 issued Dec. 22, 2023, 3 pages. [See p. 2-3].
Jingzhe, G. "Effects of Electrode State on Quality of Welded Joint of Galvanized Steel," Hot Working Technology, Mar. 2011, vol. 40, No. 5, pp. 150-152. [English Translation of Abstract only].

* cited by examiner

【FIG. 1】
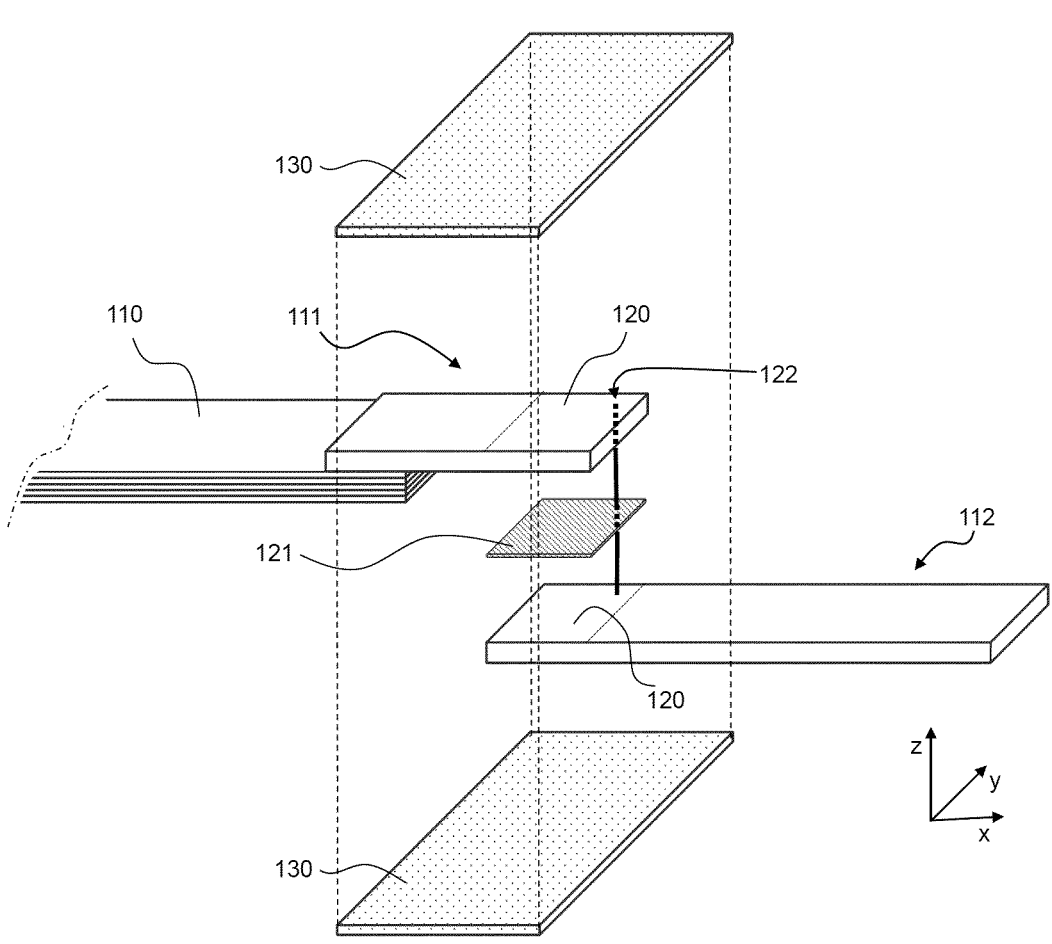

【FIG. 2】
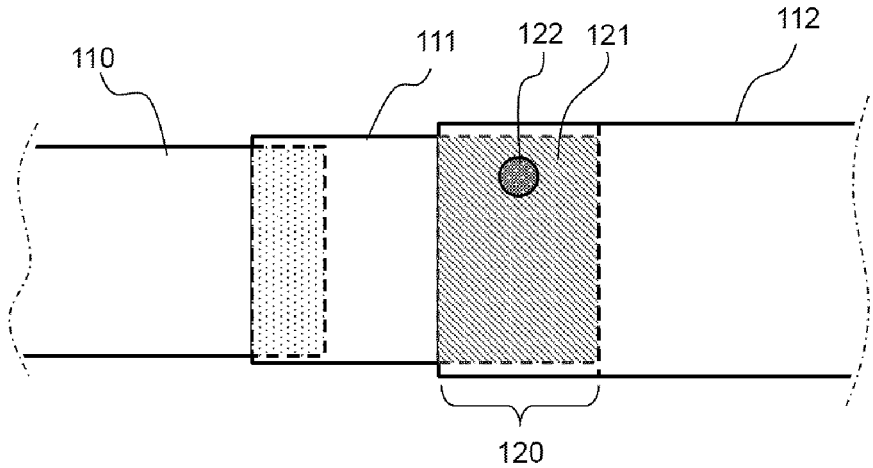
【FIG. 3】
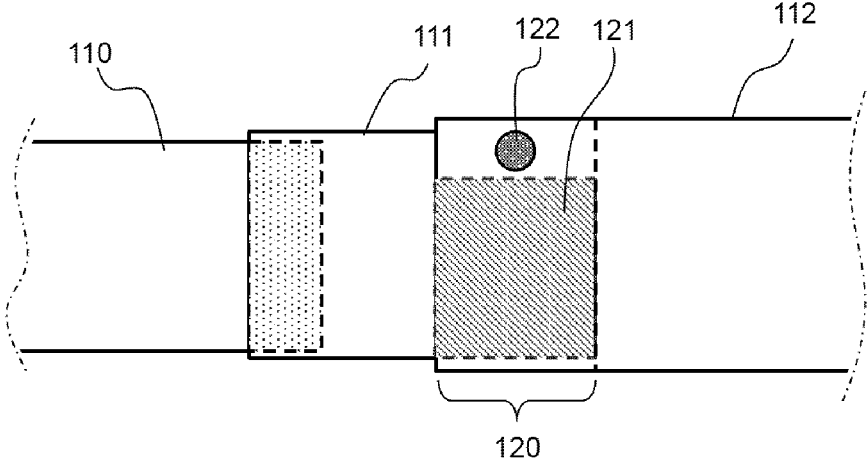

【FIG. 4】
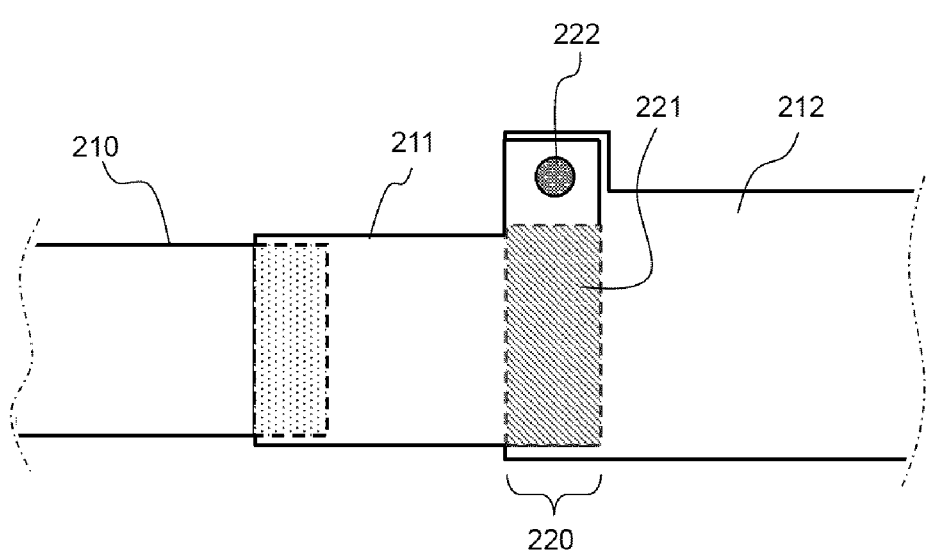

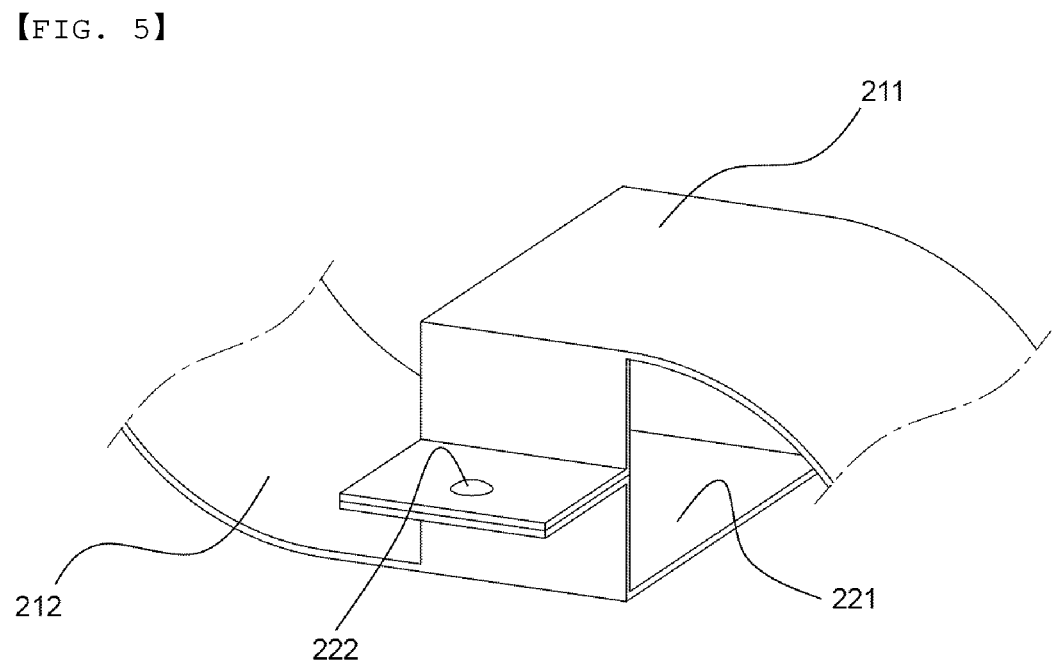

【FIG. 5】

【FIG. 6】
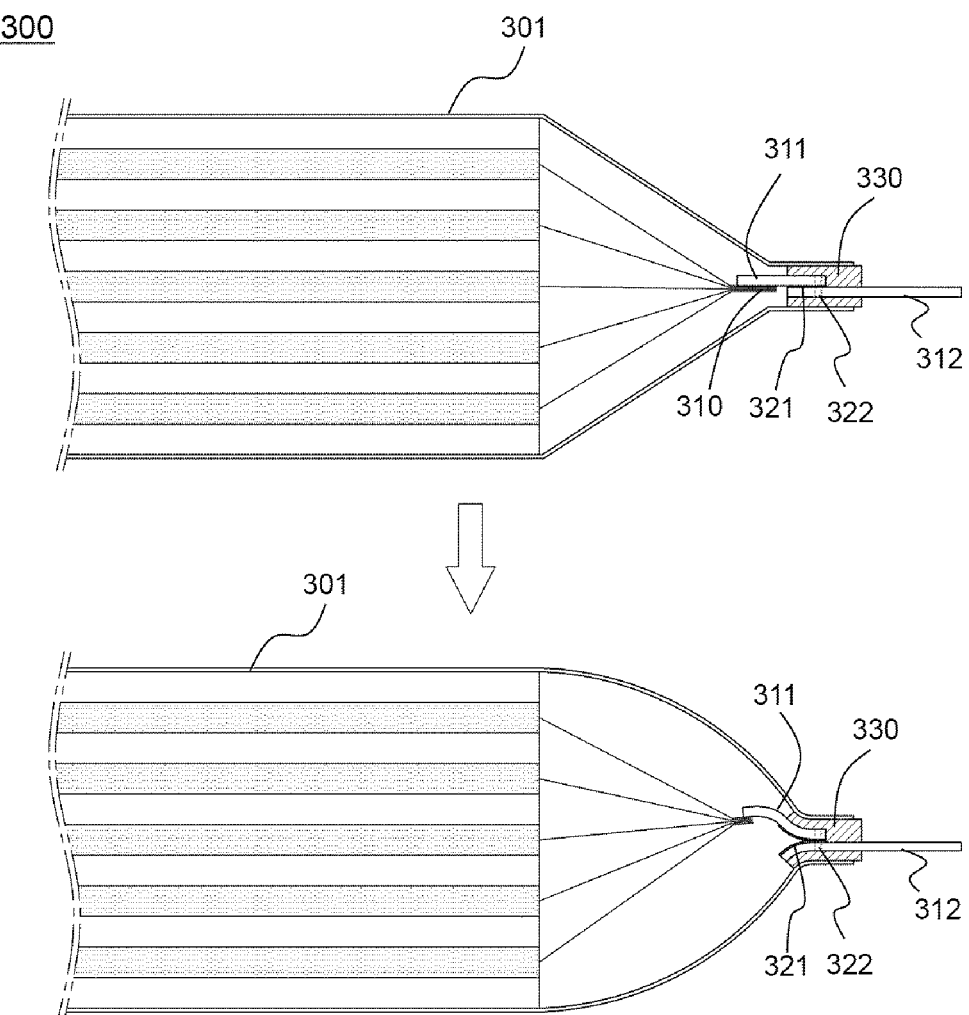

ELECTRODE ASSEMBLY INCLUDING ELECTRODE LEAD COUPLING UNIT COUPLED BY ADHESION PORTION AND SPOT WELDING AND POUCH-SHAPED BATTERY CELL INCLUDING THE SAME

CROSS-REFERENCE TO RELATED APPLICATIONS

This application is a national phase entry under 35 U.S.C. § 371 of International Application No. PCT/KR2021/001111, which claims priority to Korean Patent Application No. 10-2020-0015596 filed on Feb. 10, 2020, the disclosures of which are hereby incorporated herein by reference in their entireties.

TECHNICAL FIELD

This application claims the benefit of priority to Korean Patent Application No. 2020-0015596 filed on Feb. 10, 2020, the disclosure of which is incorporated herein by reference in its entirety.

TECHNICAL FIELD

The present invention relates to an electrode assembly including an electrode lead coupling portion coupled by an adhesion portion and spot welding and a pouch-shaped battery cell including the same, and more particularly to an electrode assembly configured to allow voltage measurement to be performed using current that slightly flows even in the case in which current that flows at the time of charging and discharging is interrupted due to an increase in pressure in a pouch-shaped battery cell, whereby it is possible to measure the voltage of the pouch-shaped battery cell, and a pouch-shaped battery cell including the same.

BACKGROUND ART

A lithium secondary battery is formed by stacking a positive electrode, a separator, and a negative electrode. Materials for the positive electrode, a separator, and a negative electrode are selected in consideration of the lifespan, charge and discharge capacities, and safety of the battery. In the lithium secondary battery, intercalation of lithium ions from a lithium metal oxide of the positive electrode to a graphite electrode of the negative electrode and deintercalation of the lithium ions from the graphite electrode of the negative electrode to the lithium metal oxide of the positive electrode are repeatedly performed, whereby the lithium secondary battery is charged and discharged.

The lithium secondary battery has safety-related weak points, such as internal short circuit due to external impact, heat generation due to overcharging and overdischarging, and electrolyte decomposition and thermal runaway caused by heat generation. Specifically, in the lithium secondary battery, electrochemical reaction occurs between an electrolytic solution and an electrode active material during charging and discharging thereof, whereby gas is generated. The gas increases pressure in the lithium secondary battery, which causes problems, such as reduction in coupling force between components, damage to a battery case, early operation of a protection circuit, deformation of the electrodes, internal short circuit, and explosion.

In order to prevent such problems, technology for providing a current interrupt device (CID) in the lithium secondary battery and operating the CID when pressure in the battery increases in an overcharging situation to interrupt the supply of current has been proposed.

In connection therewith, Patent Document 1 discloses a pouch-shaped secondary battery including a first electrode lead having one end connected to an electrode assembly and the other end extending to a junction of a pouch case, a second electrode lead detachably connected to the first electrode lead, the second electrode lead extending out of the pouch case so as to be exposed, a connection layer configured to couple the first electrode lead and the second electrode lead to each other, and a sealing layer configured to couple the electrode leads and the pouch case to each other, wherein the connection layer is more weakly coupled than the sealing layer, and a notch is formed in one end of the sealing layer. The pouch-shaped secondary battery is configured to have a structure in which, when the pouch-shaped secondary battery swells, the notch formed in the sealing layer ruptures, whereby electrical connection between the electrode leads is completely interrupted.

Patent Document 2 discloses a secondary battery, wherein each of a tab connection portion and a lead is fixed to one of the upper surface and the lower surface of a pouch sealing portion, when the upper surface and the lower surface of the sealing portion are separated from each other due to an increase in pressure in a pouch, a weld between the tab connection portion and the lead ruptures, a weld region between the tab connection portion and the lead is formed so as to have different peel strengths at one side and the other side thereof, and rupture starts to occur from the side at which the peel strength is relatively low. The secondary battery is configured to have a structure in which a weld portion between the tab connection portion and the lead ruptures when pressure in the pouch increases, whereby electrical connection therebetween is interrupted.

Patent Document 3 discloses a pouch-shaped secondary battery including a first electrode lead having one end connected to electrode tabs, a second electrode lead having one end connected to the other end of the first electrode lead and the other end protruding out of a battery case, and a connection portion configured to connect the first electrode lead and the second electrode lead by adhesion, wherein at least one of the first and second electrode leads is provided with at least one notch, which is formed in an adhesion surface at which the electrode leads are adhered to each other through the connection portion. When gas is generated in the case, whereby pressure increases, the plurality of electrode leads are separated stepwise, whereby it is possible for a user to recognize replacement timing before electrical connection therebetween is completely interrupted.

In Patent Document 3, resistance of the electrode lead is measured in every separation step, whereby it is possible to inform the user of replacement timing of the battery.

As described above, the prior art documents disclose methods of completely interrupting electrical connection between the electrode leads as the result of the electrode leads being cut, but do not disclose technology capable of checking the state of the battery cell even after electrical connection therebetween is interrupted.

PRIOR ART DOCUMENTS (Patent Document 1) Korean Patent Application Publication No. 2018-0119106 (2018.11.01)
(Patent Document 2) Korean Patent Application Publication No. 2019-0083413 (2019.07.12)

(Patent Document 3) Korean Patent Application Publication No. 2019-0027615 (2019.03.15)

DISCLOSURE

Technical Problem

The present invention has been made in view of the above problems, and it is an object of the present invention to provide an electrode assembly including a CID structure configured not to completely interrupt the flow of current, wherein the electrode assembly includes an electrode lead coupling portion coupled by an adhesion portion and spot welding such that the state of a battery cell is checked even in the state in which the CID is operated, and a pouch-shaped battery cell including the same.

Technical Solution

In order to accomplish the above object, an electrode assembly according to the present invention is configured such that a plurality of electrodes is stacked in the state in which a separator is interposed between the electrodes, electrode tabs protruding from the electrodes are coupled to an electrode lead in a state of forming an electrode tab bundle, the electrode lead includes a first electrode lead coupled to the electrode tabs and a second electrode lead coupled to the first electrode lead, and an electrode lead coupling portion configured to allow the first electrode lead and the second electrode lead coupled to be coupled to each other includes an adhesion portion and a spot welding portion.

The spot welding portion may be formed in the adhesion portion.

The spot welding portion may be formed so as not to overlap the adhesion portion.

Insulative films may be attached to the upper surface and the lower surface of the electrode lead coupling portion.

The adhesion portion may be made of an adhesive material mixed with a conductive material.

The conductive material may include at least one selected from the group consisting of silver, copper, nickel, and carbon.

The adhesive material may include an epoxy-based or imide-based polymer.

Adhesion force of portions coupled to each other through the adhesion portion may be lower than coupling force of portions coupled to each other by spot welding.

The electrode may be at least one of a positive electrode and a negative electrode.

In addition, the present invention provides a pouch-shaped battery cell including the electrode assembly, wherein, when a battery case swells due to an increase in pressure in the pouch-shaped battery cell, the first electrode lead and the second electrode lead are separated from each other at the adhesion portion of the electrode lead coupling portion, and coupling between the first electrode lead and the second electrode lead is maintained at the spot welding portion.

When the battery case swells, a sealed state of the pouch-shaped battery cell may be maintained by the insulative films.

In addition, when the battery case swells, voltage measurement may be possible through the portions having coupling therebetween maintained by spot welding.

Advantageous Effects

As is apparent from the above description, in an electrode assembly according to the present invention, the coupling state of a spot welding portion, the coupling force of which is high, may be maintained even in the case in which electrical connection of an electrode lead coupling portion is partially interrupted.

Since microcurrent flows through the spot welding portion, the coupling state of which is maintained, it is possible to measure the voltage of a battery cell.

It is possible to continuously monitor the state of the battery cell by measuring the voltage of the battery cell, as described above. Consequently, it is possible to determine whether the battery cell is in a high-voltage state due to overcharging or a low-voltage state in which the battery cell may be moved in order to discard the battery cell, whereby it is possible to safely discard the battery cell and to shorten time necessary for stabilization.

DESCRIPTION OF DRAWINGS

FIG. 1 is an exploded perspective view of an electrode lead coupling portion according to a first embodiment.

FIG. 2 is a plan view of the electrode lead coupling portion of FIG. 1, from which insulative films are omitted.

FIG. 3 is a plan view of an electrode lead coupling portion according to a second embodiment.

FIG. 4 is a plan view of an electrode lead coupling portion according to a third embodiment.

FIG. 5 is a perspective view showing a deformed state of the electrode lead coupling portion of FIG. 4.

FIG. 6 is a vertical sectional view of a pouch-shaped battery cell according to the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

A description to embody elements through limitation or addition may be applied to all inventions, unless particularly restricted, and does not limit a specific invention.

Hereinafter, embodiments of the present invention will be described in detail with reference to the accompanying drawings.

In an electrode assembly according to the present invention, a plurality of electrodes is stacked in the state in which a separator is interposed therebetween, and electrode tabs protruding from the electrodes are coupled to an electrode lead in the state of forming an electrode tab bundle.

The electrodes may be positive electrodes, negative electrodes, or a positive electrode and a negative electrode. In general, a positive electrode, a separator, and a negative electrode may be sequentially stacked.

Specifically, the electrode assembly may be classified as a jelly-roll type (wound type) electrode assembly, which is configured to have a structure in which a long sheet type positive electrode and a long sheet type negative electrode are wound in the state in which a separator is disposed between the positive electrode and the negative electrode, a stacked type electrode assembly, which is configured to have a structure in which a plurality of positive electrodes, each of which is cut to a predetermined size, and a plurality of negative electrodes, each of which is cut to a predetermined size, are sequentially stacked in the state in which separators are disposed respectively between the positive electrodes and the negative electrodes, a stacked/folded type electrode assembly, which is configured to have a structure in which bi-cells or full cells, in each of which a predetermined number of positive electrodes and a predetermined number of negative electrodes are stacked in the state in which separators are disposed respectively between the positive electrodes and the negative electrodes, are wound using a separator sheet, or a laminated/stacked electrode assembly, which is configured to have a structure in which the bi-cells or the full cells are stacked in the state in which a separator is interposed between the bi-cells or the full cells and laminated.

Each of the stacked type electrode assembly, the stacked/folded type electrode assembly, and the laminated/stacked electrode assembly includes a plurality of positive electrodes, each of which is cut to a predetermined size, and a plurality of negative electrodes, each of which is cut to a predetermined size, and electrodes of the electrode assembly including the positive electrodes and the negative electrodes include electrode tabs protruding in one direction. The electrode tabs are stacked in a direction perpendicular to the ground to form an electrode tab bundle, and the electrode tab bundle may extend outwards from a battery case and may be coupled to an electrode lead, which serves as an electrode terminal, so as to be electrically connected thereto.

In connection therewith, FIG. 1 is an exploded perspective view of an electrode lead coupling portion according to a first embodiment, and FIG. 2 is a plan view of the electrode lead coupling portion of FIG. 1, from which insulative films are omitted.

Referring to FIGS. 1 and 2, an electrode assembly according to the present invention includes a two-unit electrode lead. A plurality of electrode tabs is stacked in a direction perpendicular to the ground to constitute an electrode tab bundle 110, the uppermost electrode tab of the electrode tab bundle 110 is coupled to the end of a first electrode lead 111 in a direction toward the electrode assembly, and a second electrode lead 112 is coupled to the end of the first electrode lead 111 in the opposite direction.

An adhesion portion 121 and a spot welding portion 122 are formed at an electrode lead coupling portion 120, at which the first electrode lead 111 and the second electrode lead 112 are coupled to each other. The adhesion portion 121 may be made of an adhesive material mixed with a conductive material so as to achieve electrical connection between the first electrode lead 111 and the second electrode lead 112.

The conductive material may include at least one selected from the group consisting of silver, copper, nickel, and carbon. Specifically, the conductive material may consist of silver particles/wire, Cu/Ni core-shell particles, copper particles/wire, or carbon nanotube (CNT).

In addition, one or a mixture of two or more selected from among graphite, such as natural graphite or artificial graphite; carbon black, such as acetylene black, Ketjen black, channel black, furnace black, lamp black, or thermal black; conductive fiber, such as carbon fiber or metallic fiber; metallic powder, such as carbon fluoride powder, aluminum powder, nickel powder, gold powder, silver powder, or copper powder; conductive whisker, such as zinc oxide or potassium titanate; a conductive metal oxide, such as titanium oxide; and a conductive material, such as a polyphenylene derivative, may be used as the conductive material.

The adhesive material may include at least one of an acrylic resin, an epoxy resin, an ethylene propylene diene monomer (EPDM) resin, a chlorinated polyethylene (CPE) resin, silicone, polyurethane, a urea resin, a melamine resin, a phenol resin, an unsaturated ester resin, polypropylene, polyethylene, polyimide, and polyamide, which are thermosetting polymer resins. For example, the adhesive material may include an epoxy resin or an imide-based polymer.

In general, coupling force due to an adhesive material is lower than coupling force due to spot welding. In the present invention, therefore, the coupling force of the adhesion portion is lower than the coupling force of the spot welding portion.

The positions of the electrode tab bundle and the first electrode lead in an upward-downward direction at the time of coupling therebetween and the positions of the first electrode lead and the second electrode lead in the upward-downward direction at the time of coupling therebetween are not limited to the positions shown in FIG. 1.

That is, the electrode tabs may be divided into two groups, each of which may be attached to a corresponding one of the upper surface and the lower surface of the first electrode lead, and the second electrode lead may be attached to the upper surface of the first electrode lead.

In addition, the first electrode lead 111 and the second electrode lead 112 may have different widths in a y-axis direction. Alternatively, the first electrode lead 111 and the second electrode lead 112 may have the same widths.

The adhesion portion 121 may be formed at a part at which the first electrode lead 111 and the second electrode lead 112 overlap each other, and a double-sided tape may be attached or an adhesive material may be applied.

Spot welding is a kind of resistance welding in which, when current is supplied in the state in which two metals are fixed between electrodes while overlapping each other, the metals in contact with the electrodes are locally heated and, at the same time, when pressure is applied to the electrodes, the two metals are joined to each other.

Spot welding has low maintenance cost and is rapidly and simply performed. Each of the first electrode lead and the second electrode lead has a small thickness. In the present invention, therefore, spot welding may be appropriately used in order to couple the first electrode lead and the second electrode lead to each other.

In a concrete example, the spot welding portion 122 may be formed in the adhesion portion 121. In consideration of the fact that coupling between the first electrode lead 111 and the second electrode lead 112 through the spot welding portion 122 must be maintained even in the case in which coupling between the first electrode lead 111 and the second electrode lead 112 through the adhesion portion 121 is released, it is preferable that the spot welding portion 122 be formed in the adhesion portion 121 in the state of being biased to one side of the adhesion portion 121. For example, the spot welding portion 122 may be formed at the outer peripheral edge of the adhesion portion 121.

Referring back to FIG. 1, insulative films 130 are added to the upper surface and the lower surface of the electrode lead coupling portion 120. When thermal fusion sealing is performed in the state in which the first electrode lead 111 and the second electrode lead 112, to which the insulative films 130 are added, are disposed on a sealing portion of a battery case, it is possible to secure insulation between the battery case and the first and second electrode leads.

In addition, even in the case in which the first electrode lead and the second electrode lead are separated from each other at the electrode lead coupling portion due to an increase in pressure in the battery case, it is possible to primarily secure sealability of the battery case due to the insulative films. However, in the case in which the pressure in the battery case is continuously increased after the first electrode lead and the second electrode lead are separated from each other, sealing due to the insulative films may be released and venting may occur.

FIG. 3 is a plan view of an electrode lead coupling portion according to a second embodiment.

Referring to FIG. 3, an electrode tab bundle 110, a first electrode lead 111, and a second electrode lead 112 may be made of the same materials as the components shown in FIG. 2 and may have the same sizes as the components shown in FIG. 2. The second embodiment is identical to the embodiment of FIG. 2 in that an adhesion portion 121 having an adhesive material applied thereto and a spot welding portion 122 are formed at a part at which the first electrode lead 111 and the second electrode lead 112 overlap each other.

However, the second embodiment is different from the embodiment of FIG. 2 in that, in an electrode lead coupling portion 120 of FIG. 3, the adhesion portion 121 and the spot welding portion 122 are formed so as not to overlap each other.

In this case, the first electrode lead 111 and the second electrode lead 112 are completely separated from each other at the adhesion portion 121, and coupling therebetween is maintained only at the spot welding portion 122. Consequently, it is possible to secure coupling between the first electrode lead and the second electrode lead at a narrower part than the electrode lead coupling portion shown in FIG. 2.

FIG. 4 is a plan view of an electrode lead coupling portion according to a third embodiment, and FIG. 5 is a perspective view showing a deformed state of the electrode lead coupling portion of FIG. 4.

Referring to FIGS. 4 and 5, a first electrode lead 211 is attached to the end of an electrode tab bundle 210, and a second electrode lead 212 is attached to the side of the first electrode lead 211 opposite the side of the first electrode lead 211 to which the electrode tab bundle 210 is attached.

An electrode lead coupling portion 220 is formed at a part at which the first electrode lead 211 and the second electrode lead 212 overlap each other, and an adhesion portion 221 having an adhesive added thereto and a spot welding portion 222 are located so as not to overlap each other.

A description of FIGS. 1 and 2 may be identically applied to the adhesion portion 221 having the adhesive added thereto and the spot welding portion 222 except that the adhesion portion and the spot welding portion are located so as not to overlap each other.

In the case in which the electrode lead coupling portion having the structure shown in FIGS. 4 and 5 is formed, electrical connection between the first electrode lead 211 and the second electrode lead 212 may be stably achieved through the adhesion portion 221 and the spot welding portion 222 in a normal state. Even in the case in which a battery case swells due to an increase in pressure in a battery cell, whereby coupling between the first electrode lead 211 and the second electrode lead 212 is released at the adhesion portion 221, coupling between the first electrode lead and the second electrode lead may be securely maintained at the spot welding portion 222, which is formed so as not to overlap the adhesion portion 221.

FIG. 6 is a vertical sectional view of a pouch-shaped battery cell according to the present invention, wherein the state of the pouch-shaped battery cell before a battery case swells and the state of the pouch-shaped battery cell after the battery case swells due to an increase in pressure in the pouch-shaped battery cell are shown in vertical sectional views.

Referring to FIG. 6, in the pouch-shaped battery cell 300, an electrode assembly is received in a battery case 301 made of a laminate sheet, electrode tabs protruding from one side of the electrode assembly form an electrode tab bundle 310, a first electrode lead 311 is coupled to the electrode tab bundle 310, and a second electrode lead 312 is coupled to the first electrode lead 311.

Insulative films 330 are attached to the upper surface and the lower surface of an electrode lead coupling portion, at which the first electrode lead 311 and the second electrode lead 312 are coupled to each other. Heat and pressure may be applied to a sealing portion of the battery case 301 in the state in which the first electrode lead 311 and the second electrode lead 312, to which the insulative films 330 are attached, are disposed on the sealing portion, whereby sealing of the battery case may be achieved.

As the pouch-shaped battery cell 300 is repeatedly charged and discharged, gas is generated as side reaction due to electrochemical reaction of an electrolytic solution, and pressure in the pouch-shaped battery cell is increased due to the gas, whereby the battery case 301 swells. In the case in which the increased pressure in the battery case is higher than sealing force of the battery case, the battery case may rupture and explode. Consequently, charging of the battery cell may be terminated in advance in order to prevent explosion of the pouch-shaped battery cell.

The first electrode lead 311 is attached to an upper battery case via the insulative film 330, and the second electrode lead 312 is attached to a lower battery case via the insulative film 330. When the battery case 301 swells, the first electrode lead 311 moves in a direction in which the upper battery case swells, and the second electrode lead 312 moves in a direction in which the lower battery case swells, whereby the first electrode lead 311 and the second electrode lead 312 are separated from each other at an adhesion portion 321. As the result of the first electrode lead and the second electrode lead being separated from each other, the flow of current is abruptly reduced, whereby charging of the pouch-shaped battery cell 300 is terminated, and therefore the battery case 301 swells no further.

Since the coupling force of a spot welding portion 322 is higher than the coupling force of the adhesion portion 321, coupling between the first electrode lead 311 and the second electrode lead 312 at the spot welding portion 322 is maintained as long as the battery case swells no further.

Since only microcurrent flows through the spot welding portion 322, it is possible to measure the voltage of the pouch-shaped battery cell. Consequently, it is possible to check the state of the battery cell even in the state in which coupling between the first electrode lead and the second electrode lead is released at the adhesion portion.

The magnitude of the voltage measured as described above may become an index indicating the state of the battery cell. Conventionally, in the case in which electrode leads are separated from each other due to overcharging, whereby charging is terminated, it is not possible to check the state of the battery cell any more. In the present invention, however, it is possible to measure the voltage of the battery cell, since microcurrent flows through the spot welding portion even in the state in which the electrode leads are separated from each other such that charging current cannot flow. Since it is possible to check the state of the battery cell through the magnitude of the measured voltage, as described above, it is possible to pay considerable attention to the battery cell during transportation in order to provide for the occurrence of an accident, such as outbreak of fire, and to discard the battery cell in the state in which safety of the battery cell is secured.

Also, in the present invention, since it is possible to measure the voltage of the battery cell even in the case in which the flow of current is interrupted as the result of operation of the electrode leads in an abnormal environment, it is possible to check a decrease in voltage of the battery cell. Consequently, it is possible to recognize the occurrence of short circuit in the battery cell, such as contact between different electrodes, whereby it is possible to warn of a dangerous state, such as a safety-related accident, and therefore it is possible to secure time necessary for evacuation.

In addition, conventionally, the battery cell is left alone for an arbitrary time estimated to be necessary for stabilization, since voltage measurement is difficult. In the present invention, however, it is possible to determine whether discard of the battery cell becomes possible through voltage measurement. Consequently, it is possible to shorten time for which the battery cell is left alone. In addition, it is not necessary to provide stabilization equipment in the state in which stability is secured, whereby it is also possible to reduce discard expenses.

Those skilled in the art to which the present invention pertains will appreciate that various applications and modifications are possible within the category of the present invention based on the above description.

DESCRIPTION OF REFERENCE NUMERALS

110, 210, 310: Electrode tab bundles
111, 211, 311: First electrode leads
112, 212, 312: Second electrode leads
120, 220: Electrode lead coupling portions
121, 221, 321: Adhesion portions
122, 222, 322: Spot welding portions
130, 330: Insulative films
300: Pouch-shaped battery cell
301: Battery case

INDUSTRIAL APPLICABILITY

As is apparent from the above description, in an electrode assembly according to the present invention, the coupling state of a spot welding portion, the coupling force of which is high, may be maintained even in the case in which electrical connection of an electrode lead coupling portion is partially interrupted.

Since microcurrent flows through the spot welding portion, the coupling state of which is maintained, it is possible to measure the voltage of a battery cell.

It is possible to continuously monitor the state of the battery cell by measuring the voltage of the battery cell, as described above. Consequently, it is possible to determine whether the battery cell is in a high-voltage state due to overcharging or a low-voltage state in which the battery cell may be moved in order to discard the battery cell, whereby it is possible to safely discard the battery cell and to shorten time necessary for stabilization.

The invention claimed is:

1. An electrode assembly, comprising:
a plurality of electrodes stacked in a state in which a respective separator is interposed between adjacent ones of the electrodes;
electrode tabs protruding from the electrodes coupled to an electrode lead, the electrode tabs together forming an electrode tab bundle; and
the electrode lead comprising a first electrode lead coupled to the electrode tabs and a second electrode lead coupled to the first electrode lead,
the electrode lead having an electrode lead coupling portion at which the first electrode lead and the second electrode lead are coupled to each other, the electrode lead coupling portion comprising an adhesion portion and a spot-welding portion,
wherein the spot-welding portion is located only substantially along a single lateral peripheral edge of the electrode lead coupling portion, such that all spot welds between the first electrode lead and the second electrode lead are located only substantially along the single lateral peripheral edge of the electrode lead coupling portion.

2. The electrode assembly according to claim 1, wherein the spot-welding portion is formed within the adhesion portion.

3. The electrode assembly according to claim 1, wherein the spot-welding portion does not overlap the adhesion portion.

4. The electrode assembly according to claim 1, further comprising insulative films attached to an upper surface and a lower surface of the electrode lead coupling portion.

5. The electrode assembly according to claim 1, wherein the adhesion portion is made of an adhesive material mixed with a conductive material.

6. The electrode assembly according to claim 5, wherein the conductive material comprises at least one selected from the group consisting of: silver, copper, nickel, or carbon.

7. The electrode assembly according to claim 5, wherein the adhesive material comprises an epoxy-based or imide-based polymer.

8. The electrode assembly according to claim 1, wherein an adhesion force between first portions of the first electrode lead and the second electrode lead coupled to each other through the adhesion portion is lower than a coupling force between second portions of the first electrode lead and the second electrode lead coupled to each other by spot welding.

9. The electrode assembly according to claim 1, wherein the electrodes are at least one of positive electrodes or negative electrodes.

10. A pouch-shaped battery cell comprising the electrode assembly according to claim 1 disposed within a battery case, wherein the pouch-shaped battery cell is configured such that
when the battery case swells due to an increase in pressure in the pouch-shaped battery cell,
the first electrode lead and the second electrode lead are separated from each other at the adhesion portion of the electrode lead coupling portion, and
a coupling between the first electrode lead and the second electrode lead is maintained at the spot-welding portion.

11. The pouch-shaped battery cell according to claim 10, wherein the pouch-shaped battery cell is configured such that when the battery case swells, a sealed state of the pouch-shaped battery cell is maintained by the insulative films.

12. The pouch-shaped battery cell according to claim 10, wherein the pouch-shaped battery cell is configured such that when the battery case swells, a voltage measurement is possible through portions of the first electrode lead and the second electrode lead having a coupling therebetween that is maintained by spot welding.

\* \* \* \* \*